(12) United States Patent
Wu et al.

(10) Patent No.: US 9,651,698 B2
(45) Date of Patent: May 16, 2017

(54) MULTI-BEAM BATHYMETRIC CHART CONSTRUCTION METHOD BASED ON SUBMARINE DIGITAL DEPTH MODEL FEATURE EXTRACTION

(71) Applicant: The Second Institute of Oceanography, State Oceanic Administration, Hangzhou (CN)

(72) Inventors: Ziyin Wu, Hangzhou (CN); Jihong Shang, Hangzhou (CN); Shoujun Li, Hangzhou (CN); Dineng Zhao, Hangzhou (CN); Jieqiong Zhou, Hangzhou (CN)

(73) Assignee: The Second Institute Of Oceanography, SOA, Hangzhou, Zhejiang Province (CN)

( * ) Notice: Subject to any disclaimer, the term of this patent is extended or adjusted under 35 U.S.C. 154(b) by 427 days.

(21) Appl. No.: 14/448,664

(22) Filed: Jul. 31, 2014

(65) Prior Publication Data
US 2015/0039229 A1 Feb. 5, 2015

(30) Foreign Application Priority Data
Aug. 1, 2013 (CN) .......................... 2013 1 0332301

(51) Int. Cl.
| | |
|---|---|
| *G01V 1/38* | (2006.01) |
| *G01V 1/32* | (2006.01) |
| *G01V 1/34* | (2006.01) |
| *G01S 15/87* | (2006.01) |
| *G01S 15/88* | (2006.01) |

(52) U.S. Cl.
CPC ............ *G01V 1/3808* (2013.01); *G01S 15/87* (2013.01); *G01S 15/88* (2013.01); *G01V 1/325* (2013.01); *G01V 1/345* (2013.01); *G01V 1/38* (2013.01)

(58) Field of Classification Search
CPC ..................................................... G01V 1/3808
USPC ............................................................ 702/5
See application file for complete search history.

(56) References Cited

U.S. PATENT DOCUMENTS

| | | | | |
|---|---|---|---|---|
| 6,721,694 B1* | 4/2004 | Lambrecht | ............. | G01S 15/89 367/21 |
| 8,605,549 B1* | 12/2013 | DiCecco | ................. | G01S 15/89 367/88 |
| 2003/0083819 A1* | 5/2003 | Rooney | .................. | G01V 11/00 702/5 |

FOREIGN PATENT DOCUMENTS

| | | |
|---|---|---|
| CN | 102749622 | 10/2012 |
| CN | 103148842 | 6/2013 |
| JP | 2010190726 | 9/2010 |

\* cited by examiner

*Primary Examiner* — Ricky Ngon
(74) *Attorney, Agent, or Firm* — Shuang Chang; PSK Intellectual Property Group, LLC

(57) ABSTRACT

The invention discloses a multi-beam bathymetric chart construction method based on submarine digital depth model feature extraction. The method comprises the steps of: constructing a DDM (Digital Depth Model) based on raw multi-beam echo soundings; establishing a slope and second derivative composite model based on the DDM; extracting feature points based on DDM sub-blocks; querying the multi-beam depth based on the feature points; constructing the multi-beam bathymetric chart based on layers.

1 Claim, 4 Drawing Sheets

MULTI-BEAM BATHYMETRIC CHART CONSTRUCTION METHOD BASED ON SUBMARINE DIGITAL DEPTH MODEL FEATURE EXTRACTION

FIELD OF THE INVENTION

The present invention relates to the field of submarine topography mapping, marine surveying, marine geographic information systems, computer graphics and underwater science.

BACKGROUND OF THE INVENTION

Depth annotation is an important part of submarine topography mapping, chart drawing and marine engineering drawing. Bathymetric chart is capable to quantitatively describe topography and geomorphology of submarine, and intuitively reflect the navigation capacity of sea area. Bathymetric chart plays a role that can't be replaced by other charts in scientific research and navigation. The difference between a bathymetric chart and other topographical maps is that the representation of a bathymetric chart mainly relies on depth annotations with subsidiary isobath, combined with substrate annotations. Depth is the main parameter to reflect topographic relief.

The single-beam echo sounding obtains less bathymetric data, and most of raw data are retained when mapping bathymetric chart. Its disadvantage is the sparse of the data which leads to missing submarine topographic feature points. Now the single-beam echo sounding is rarely used in high-resolution seafloor detection. High-density multi-beam echo sounding (MBES) are currently the highest-resolution representation of the morphology of seafloor. With the aid of the full-coverage technology, high-resolution sounding data are obtained, and large-scale bathymetric charts are derived. But a notable feature of MBES is the large amount of the high-resolution sounding data. So in accordance with the principle of depth annotations, a series of raw sounding data that meet mapping requirements should be selected from the large amount of sounding data.

Currently there are mainly two ways to draw bathymetric charts based on multi-beam soundings: using grid data directly, or using the central beam. Both of them are limited in use. The disadvantage of using grid data directly is that the measured data are not employed; negatively affecting the reliability of the maps; while using the central beam tends to miss the feature depth points of survey lines which need to be identified.

Full use of the raw multi-beam sounding data to construct bathymetric chart is not identified in the art and remains to be answered.

SUMMARY OF THE INVENTION

Our invention aims to provide a solution to the existing problem that it's difficult to draw bathymetric charts based on a large amount of multi-beam echo sounding data. The invention provides a multi-beam bathymetric chart construction method based on submarine digital depth model feature extraction, comprising the steps of: constructing a digital depth model (DDM) based on raw multi-beam echo sounding; establishing a slope and second derivative composite model based on the DDM; extracting feature points based on DDM sub-blocks; querying the multi-beam sounding data based on the feature points; constructing the multi-beam bathymetric chart based on layers.

According to one embodiment of present disclosure, a multi-beam bathymetric chart construction method based on submarine digital depth model feature extraction, comprising the steps of:

Step 1 constructing a digital depth model (DDM) based on raw multi-beam echo sounding, using a multi-beam postprocessing system, processing the raw multi-beam data as following:

1.1) applying tide correction, draft correction and sound velocity correction to the raw multi-beam echo sounding data set $Raw=\{raw_i\}_{i=1,n}$, eliminating effects of water level and sound velocity on multi-beam echo sounding (MBES), and forming a preliminary processing data set $Proc1=\{proc1_i\}_{i=1,n}$, wherein n is a natural number;

1.2) building a topographic trend surface, using automatic filtering method to process $Proc1=\{proc1_i\}_{i=1,n}$, eliminating effects of gross errors on MBES, and forming a postprocessing data set $Proc2=\{proc2_i\}_{i=1,n}$;

1.3) using three-view projection to process $Proc2=\{proc2_i\}_{i=1,n}$, further eliminating effects of ocean noise of a variety of sources on MBES, and forming a discrete full-beam bathymetric data set $Proc3=\{x_i, y_i, z_i\}_{i=1,m}$, wherein m is a natural number;

1.4) using Inverse Distance Weighted (IDW) method, building a digital model of $Proc3=\{x_i, y_i, z_i\}_{i=1,m}$, forming the digital depth model $$DDM = \{ddm_{k,l} = \{x_{k,l}, y_{k,l}, dep_{k,l}\}\}_{k=1,K,\ l=1,L}$$

wherein K is the number of rows of the model, L is the number of columns of the model, both K and L are natural numbers, $x_{k,l}, y_{k,l}$ represent coordinate and $dep_{k,l}$ represents depth value of data points of the model respectively;

Step 2 establishing a slope and second derivative composite model based on the DDM, 2.1) using eight-neighbor approach to calculate slope value $slp_{i,j}$ of each grid point of the DDM:

$$slp_{(i,j)} = \frac{1}{8}\sum_{i=k}^{k+1}\sum_{j=l}^{l+1} a\tan\left(\frac{\Delta z}{\Delta d}\right)$$

$\Delta z=|dep_{(i,j)}-dep_{(k,l)}|$, wherein $\Delta z$ is depth difference from grid point (i,j) to (k,l) in the DDM;

$\Delta d=\sqrt{(x_{i,j}-x_{(k,l)})^2+(y_{i,j}-y_{(k,l)})^2}$, wherein $\Delta d$ is distance from the grid point (i,j) to (k,l) in the model;

2.2) using the eight-neighbor approach to calculate the second derivative $sec_{(i,j)}$ of each grid point of the model:

$$sec_{(i,j)} = \frac{1}{8}\sum_{i=k}^{k+1}\sum_{j=l}^{l+1} a\tan\left(\frac{\Delta\delta}{\Delta d}\right)$$

$$\Delta\delta = |slp_{(i,j)} - slp_{(k,l)}|$$

2.3) forming the composite model $$DSSM = \{dss_{i,j} = (ddm_{i,j}, slp_{i,j}, sec_{i,j})\}_{\substack{i=1,K \\ j=1,L}};$$

Step 3 extracting feature points based on DDM sub-blocks, 3.1) model sub-blocking:

sub-blocking the model DSSM by interlaced dislocation of squares with side length of d, wherein d is determined in accordance with cartographic scale, d=[0.018×scale, 0.03×scale], wherein scale is a scale value; or d is specified directly by a user;

wherein the interlaced dislocation refers to that if a i-th row of the model is sub-blocked by d as interval, when it comes to a (i+Δi)-th row, leaves a half of d as interval firstly, and then sub-blocks the model by d as interval; thus the interlaced dislocation results in a diamond structure of sub-blocking;

after the sub-blocking, obtaining a new diamond grid model $$DSSM1 = \left\{ dss1_{I,J} = \{dss_{i,j}\}_{\substack{i=I,I+\Delta i \\ j=J,J+\Delta i}} \right\}_{\substack{I=1,K1 \\ J=1,L1}},$$

wherein each sub-block $dss1_{I,J}$ consists of sub-models $$\{dss_{i,j}\}_{\substack{i=I,I+\Delta i \\ j=J,J+\Delta i}},$$

Kl and Ll are the number of rows and columns of the sub-blocking model respectively, and both Kl and Ll are natural numbers;

3.2) Numerical calculation of the sub-block model:

3.2.1) Calculating an average depth value $$\overline{dep}_{I,J} = \frac{1}{Num} \sum_{i=I}^{I+\Delta i} \sum_{j=J}^{J+\Delta i} dep_{(i,j)} \text{ of } dss1_{I,J} = \{dss_{i,j}\}_{\substack{i=I,I+\Delta i \\ j=J,J+\Delta i}},$$

an average slope value $$\overline{slp}_{I,J} = \frac{1}{Num} \sum_{i=I}^{I+\Delta i} \sum_{j=J}^{J+\Delta i} slp_{(i,j)},$$

and an average second derivative value $$\overline{sec}_{I,J} = \frac{1}{Num} \sum_{i=I}^{I+\Delta i} \sum_{j=J}^{J+\Delta i} sec_{(i,j)},$$

wherein Num is the number of grid points of each sub-block model, and Num is a natural number;

3.2.2) Using the inverse distance weighted (IDW) method, calculating the depth value $\Delta dep_{I,J}$ of a central point of each sub-block model;

3.3) determining concavity and convexity of the sub-block model, 3.3.1) if $\Delta dep_{I,J} > \overline{dep}_{I,J}$, and $\overline{sec}_{I,J} > 0$, considering the surface of the sub-block model as concave;

3.3.2) if $\Delta dep_{I,J} < \overline{dep}_{I,J}$, and $\overline{sec}_{I,J} < 0$, considering the surface of the sub-block model as convex;

3.3.3) if in other cases, considering the concavity of the sub-block model not being determined hereby;

3.4) determining a feature depth point of the sub-block model, 3.4.1) if the surface of the sub-block model is concave, traversing the model $$dss1_{I,J} = \{dss_{i,j}\}_{\substack{i=I,I+\Delta i \\ j=J,J+\Delta i}},$$

selecting a maximum depth point $dss_{i\_max,j\_max}$ as the feature point; if there's more than one maximum depth point, selecting the point both with the maximum slope value and near the central point;

3.4.2) if the surface of the sub-block model is convex, traversing the model $$dss1_{I,J} = \{dss_{i,j}\}_{\substack{i=I,I+\Delta i \\ j=J,J+\Delta i}},$$

selecting a minimum depth point $dss_{i\_min,j\_min}$ as the feature point; if there's more than one minimum depth point, selecting the point both with the minimum slope value and near the central point;

3.4.3) if in other cases, selecting the central point $dss_{i\_cen,j\_cen}$ as the feature point;

3.5) identifying the feature points of the model

If $dss_{i,j}$ is the feature point, setting identification as 1, otherwise setting the identification as 0;

Step 4 querying the multi-beam sounding data based on the feature points 4.1) traversing the data set $Proc3=\{x_i, y_i, z_i\}_{i=1,m}$, querying the grid point $dss_{I,J}$ of the model according to the coordinates $(x_i, y_i)$ of each depth point, wherein the coordinates of the grid point $dss_{I,J}$ is $(X_I, Y_J)$;

4.2) if $dis=\sqrt{(x_i-X_I)^2+(y_i-Y_J)^2}<0.5\times grid\_d$, and $dss_{I,J}$ is identified as 1, using the IDW method, based on the data set $Proc3=\{x_i, y_i, z_i\}_{i=1,m}$, recalculating the depth value $dep\_new_{I,J}$ of grid points of the model DSSM, wherein grid_d is spatial distance between nearest two points, using 0.5×grid_d for re-modeling aims to make value of reconstruction model points close to true depth value, while not using raw sounding data aims to avoid accidental detection error affecting the multi-beam bathymetric chart construction;

Step 5 constructing the multi-beam bathymetric chart based on layers, using a mapping system or GIS, constructing the multi-beam bathymetric chart according to a isobath layer, a depth layer, and a modification layer;

5.1) in the isobath layer, building intermediate contour, auxiliary contour, index contour and depth annotations of index contour according to mapping scale and national standard;

5.2) in the modification layer, adding map title, scale, legend, frame, latitude and longitude lines and coastlines;

5.3) in the depth layer, traversing the model DSSM, if the model point $dss_{I,J}$ is identified as 1, and the depth value $dep\_new_{I,J}$ is not null, using the point as the feature point, if the depth value $dep\_new_{I,J}$ is null, using $dep_{I,J}$ as the feature point;

5.4) if the soundings of the bathymetric chart are sparse, decreasing the value d of sub-blocking size, returning to step 3;

5.5) if the soundings of the bathymetric chart are dense, increasing the value d of sub-blocking size, returning to step 3;

5.6) overlaying the layers, if graphic elements superimpose on each other, or the graphic elements are dense, deleting some auxiliary graphic elements.

According to another embodiment of present disclosure, wherein the step 5.4) the sparse refers to that the distance D between one point and its adjacent point is greater than double of d;

wherein the step 5.5) and step 5.6) the dense refers to that the distance D between one point and its adjacent point is less than half of d.

The invention discloses a multi-beam bathymetric chart construction method based on submarine digital depth model feature extraction in order to provide to a solution to existing problems that the raw multi-beam depth data volume is enormous and a bathymetric chart cannot be derived from the raw data without considerable effort. The method is based on the DDM sub-blocking, then a query radius is set based on the coordinates of the feature points, a point which is closest to the query radius from the raw depth data, and a model is re-established, so that the defects that the raw multi-beam depth data volume is large and the features are difficult to extract are overcome; the disadvantages that the raw sounding depth is difficult to reflect accurately by directly using DDM depth points or central beam points are also overcome. The method has a very important practical application value in submarine topography mapping, hydrographic surveying and charting, marine information systems, computer graphics and submarine scientific research.

DETAILED DESCRIPTION OF THE INVENTION

These and other features, aspects, and advantages of the present invention will become better understood with regard to the following description, and accompanying drawings.

Example 1

Figure 1:
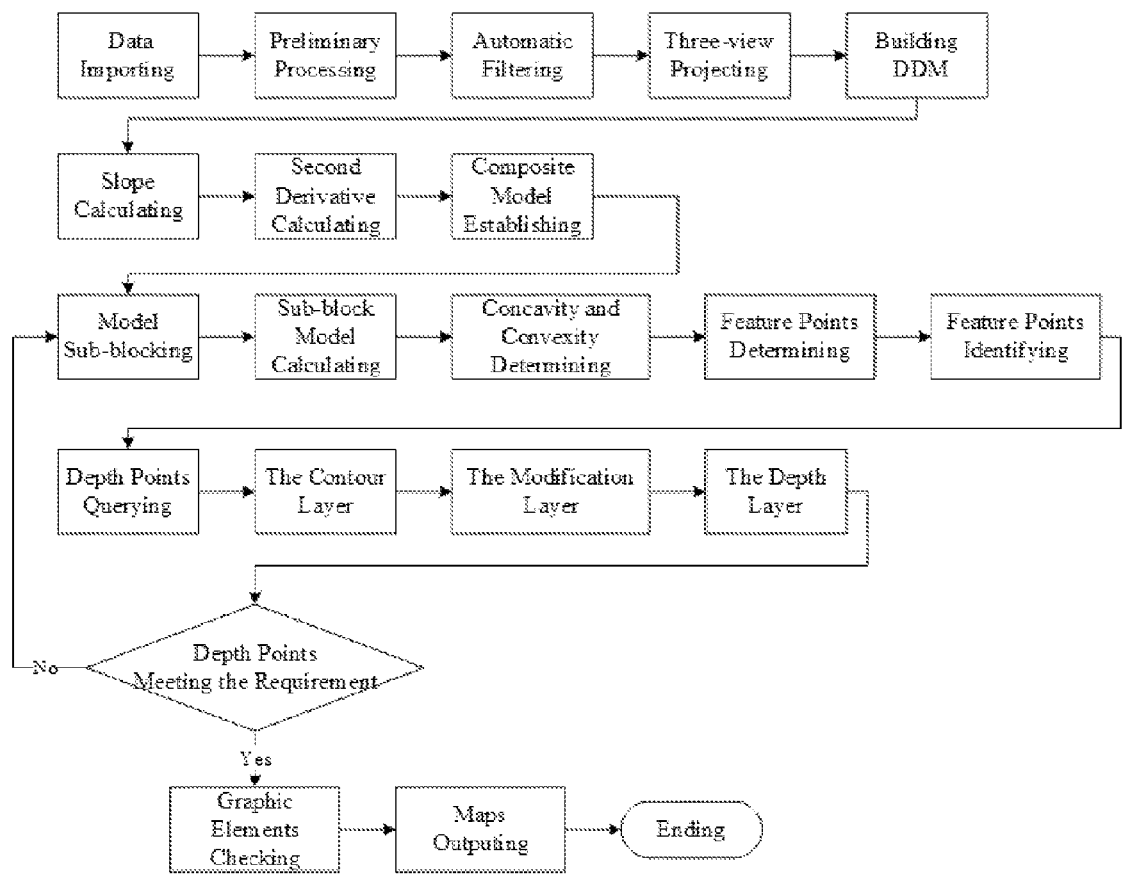
FIG. 1 illustrates a flowchart as some embodiments of the present invention.

Multi-beam bathymetric chart construction method based on submarine digital depth model feature extraction, the flowchart in the embodiment illustrated in FIG. 1, comprising steps of:

Step 1 constructing a digital depth model (DDM) based on raw multi-beam echo sounding, using a multi-beam postprocessing system, processing the raw multi-beam data as following:

1.1) applying tide correction, draft correction and sound velocity correction to the raw multi-beam echo sounding data set $Raw=\{raw_i\}_{i=1,n}$, eliminating effects of water level and sound velocity on multi-beam echo sounding (MBES), and forming a preliminary processing data set $Proc1=\{proc1_i\}_{i=1,n}$, wherein n is a natural number;

1.2) building a topographic trend surface, using automatic filtering method to process $Proc1=\{proc1_i\}_{i=1,n}$, eliminating effects of gross errors on MBES, and forming a postprocessing data set $Proc2=\{proc2_i\}_{i=1,n}$;

1.3) using three-view projection to process $Proc2=\{proc2_i\}_{i=1,n}$, further eliminating effects of ocean noise of a variety of sources on MBES, and forming a discrete full-beam bathymetric data set $Proc3=\{x_i, y_i, z_i\}_{i=1,m}$, wherein m is a natural number;

1.4) using Inverse Distance Weighted (IDW) method, building a digital model of $Proc3=\{x_i, y_i, z_i\}_{i=1,m}$, forming the digital depth model $$DDM = \{ddm_{k,l} = \{x_{k,l}, y_{k,l}, dep_{k,l}\}\}_{\substack{k=1,K \\ l=1,L}}$$

wherein K is the number of rows of the model, L is the number of columns of the model, both K and L are natural numbers, $x_{k,l}$, $y_{k,l}$ represent coordinate and $dep_{k,l}$ represents depth value of data points of the model respectively;

Step 2 establishing a slope and second derivative composite model based on the DDM, 2.1) using eight-neighbor approach to calculate slope value $slp_{(i,j)}$ of each grid point of the DDM:

$$slp_{(i,j)} = \frac{1}{8} \sum_{i=k}^{k+1} \sum_{j=l}^{l+1} a\tan\left(\frac{\Delta z}{\Delta d}\right)$$

$\Delta z = |dep_{(i,j)} - dep_{(k,l)}|$, wherein $\Delta z$ is depth difference of two points in the DDM;

$\Delta d = \sqrt{(x_{(i,j)} - x_{(k,l)})^2 + (y_{(i,j)} - y_{(k,l)})^2}$, wherein $\Delta d$ is distance of two points in the model;

2.2) using the eight-neighbor approach to calculate the second derivative $sec_{(i,j)}$ of each grid point of the model:

$$sec_{(i,j)} = \frac{1}{8} \sum_{i=k}^{k+1} \sum_{j=l}^{l+1} a\tan\left(\frac{\Delta \delta}{\Delta d}\right)$$

$\Delta \delta = |slp_{(i,j)} - slp_{(k,l)}|$ 2.3) forming the composite model $$DSSM = \{dss_{i,j} = (ddm_{i,j}, slp_{i,j}, sec_{i,j})\}_{\substack{i=1,K \\ j=1,L}};$$

Figure 2:
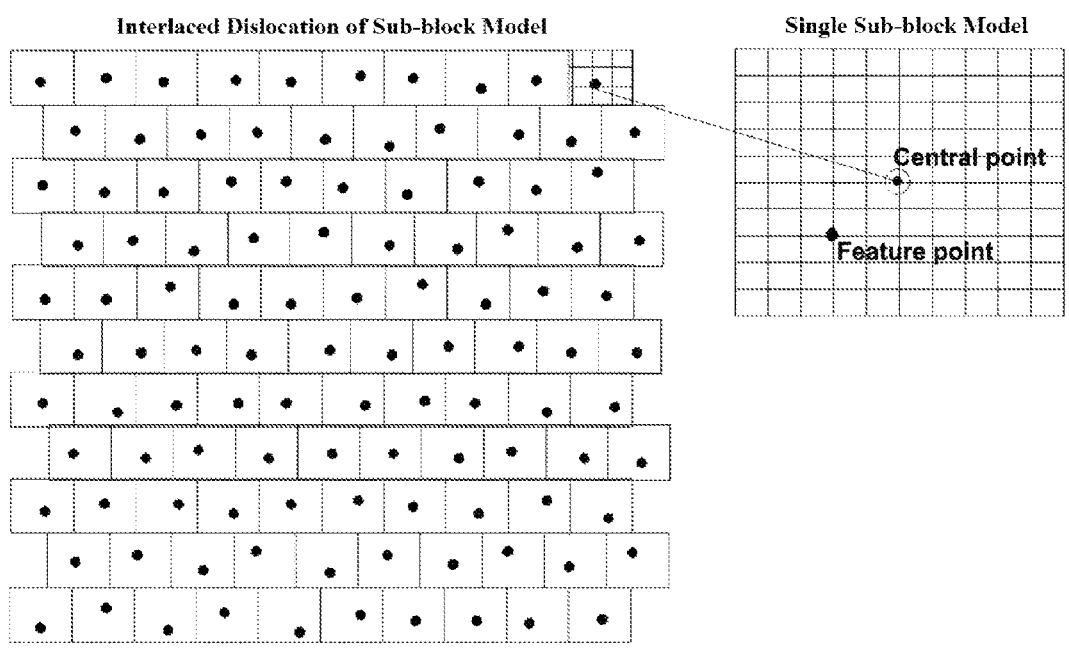
FIG. 2 illustrates a diagram of the model sub-blocking as some embodiments of the present invention.

Step 3 extracting feature points based on DDM sub-blocks,

FIG. 2 illustrates a diagram of the model sub-blocking in the embodiment of the present invention.

3.1) model sub-blocking:

sub-blocking the model DSSM by interlaced dislocation of squares with side length of d, wherein d is determined in accordance with cartographic scale, d=[0.018×scale,0.03× scale], wherein scale is a scale value; or d is specified directly by a user;

wherein the interlaced dislocation refers to that if a i-th row of the model is sub-blocked by d as interval, when it comes to a (i+Δi)-th row, leaves a half of d as interval firstly, and then sub-blocks the model by d as interval; thus the interlaced dislocation results in a diamond structure of sub-blocking;

after the sub-blocking, obtaining a new diamond grid model $$DSSM1 = \left\{ dss1_{I,J} = \{dss_{i,j}\}_{\substack{i=I,I+\Delta i \\ j=J,J+\Delta i}} \right\}_{\substack{I=1,K1 \\ J=1,L1}},$$

wherein each sub-block $dss1_{I,J}$ consists of sub models $$\{dss_{i,j}\}_{\substack{i=I,I+\Delta i \\ j=J,J+\Delta i}},$$

K1 and L1 are the number of rows and columns of the sub-block model respectively, and both K1 and L1 are natural numbers;

3.2) Numerical calculation of the sub-block model:
   3.2.1) Calculating an average depth value $$\overline{dep}_{I,J} = \frac{1}{Num}\sum_{i=I}^{I+\Delta i}\sum_{j=J}^{J+\Delta i} dep_{(i,j)} \text{ of } dss1_{I,J} = \{dss_{i,j}\}_{\substack{i=I,I+\Delta i \\ j=J,J+\Delta i}},$$

an average slope value $$\overline{slp}_{I,J} = \frac{1}{Num}\sum_{i=I}^{I+\Delta i}\sum_{j=J}^{J+\Delta i} slp_{(i,j)},$$

and an average second derivative value $$\overline{sec}_{I,J} = \frac{1}{Num}\sum_{i=I}^{I+\Delta i}\sum_{j=J}^{J+\Delta i} sec_{(i,j)},$$

wherein Num is the number of grid points of each sub-block model, and Num is a natural number;

3.2.2) Using the inverse distance weighted (IDW) method, calculating the depth value $\Delta dep_{I,J}$ of a central point of each sub-block model;

3.3) determining concavity and convexity of the sub-block model,
   3.3.1) if $\Delta dep_{I,J} > \overline{dep}_{I,J}$, and $\overline{sec}_{I,J} > 0$, considering the surface of the sub-block model as concave;
   3.3.2) if $\Delta dep_{I,J} < \overline{dep}_{I,J}$ and $\overline{sec}_{I,J} < 0$, considering the surface of the sub-block model as convex;
   3.3.3) if in other cases, considering the concavity of the sub-blocking model not being determined hereby;

3.3.3) if in other cases, considering the concavity of the sub-block model not being determined hereby;
3.4) determining a feature depth point of the sub-block model,
   3.4.1) if the surface of the sub-block model is concave, traversing the model $$dss1_{I,J} = \{dss_{i,j}\}_{\substack{i=I,I+\Delta i \\ j=J,J+\Delta i}},$$

selecting a maximum depth point $dss_{i\_max,j\_min}$ as the feature point; if there's more than one maximum depth point, selecting the point both with the maximum slope value and near the central point;

3.4.2) if the surface of the sub-block model is convex, traversing the model $$dss1_{I,J} = \{dss_{i,j}\}_{\substack{i=I,I+\Delta i \\ j=J,J+\Delta i}},$$

selecting a minimum depth point $dss_{i\_min,j\_min}$ as the feature point; if there's more than one minimum depth point, selecting the point both with the minimum slope value and near the central point;

3.4.3) if in other cases, selecting the central point $dss_{i\_cen,j\_cen}$ as the feature point;

3.5) identifying the feature points of the model

Figure 3:
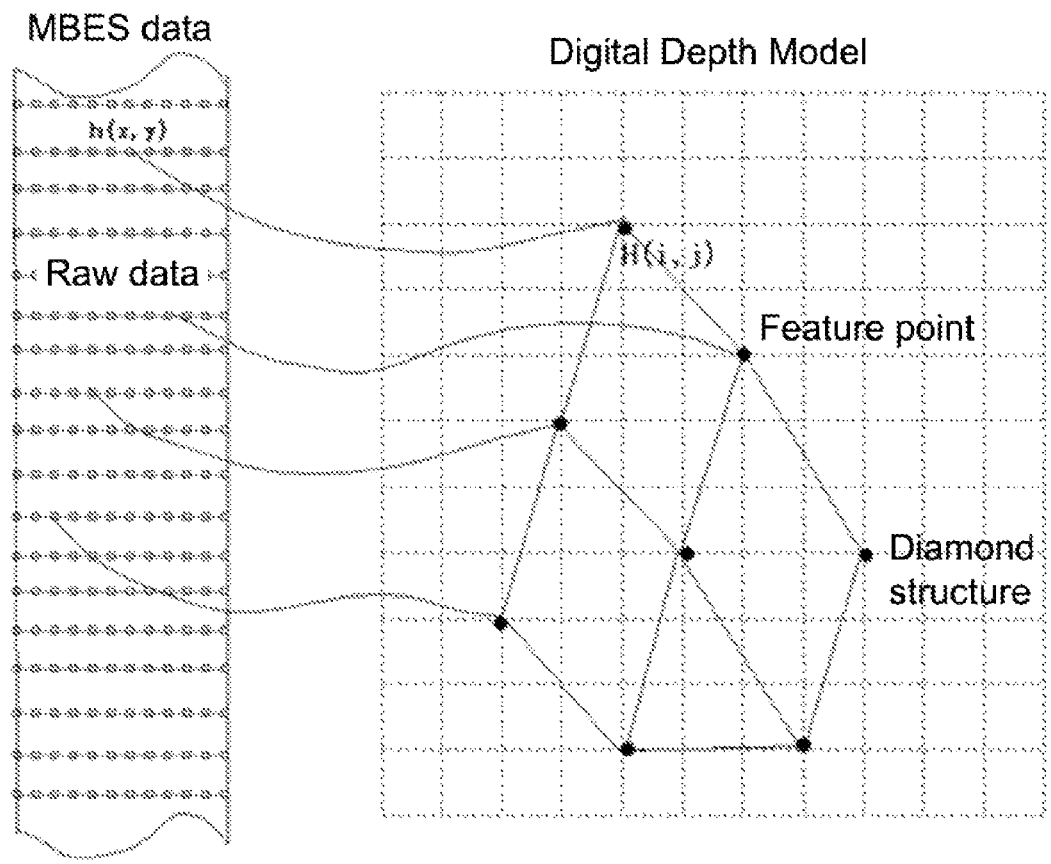
FIG. 3 illustrates a diagram of querying the raw data as some embodiments of the present invention.

If $dss_{i,j}$ is the feature point, setting identification as 1, otherwise setting the identification as 0;

Step 4 querying the multi-beam sounding data based on the feature points,

FIG. 3 illustrates a diagram of querying the raw data in the embodiment of the present invention.

4.1) traversing the data set Proc3=$\{x_i, y_i, z_i\}_{i=1,m}$, querying the grid point $dss_{I,J}$ of the model according to the coordinates $(x_i, y_i)$ of each depth point, wherein the coordinates of the grid point $dss_{I,J}$ is $(X_I, Y_J)$;

4.2) if dis=$\sqrt{(x_i-X_I)^2+(y_i-Y_J)^2}$<0.5×grid_d, and $dss_{I,J}$ is identified as 1, using the IDW method, based on the data set Proc3=$\{x_i, y_i, z_i\}_{i=1,m}$, recalculating the depth value $dep\_new_{I,J}$ of the grid points of the model DSSM, wherein grid_d is spatial distance between nearest two points, using 0.5×grid_d for re-modeling aims to make value of reconstruction model points close to true depth value, while not using raw sounding data aims to avoid accidental detection error affecting the multi-beam bathymetric chart construction;

Step 5 constructing the multi-beam bathymetric chart based on layers, using a mapping system or GIS, constructing the multi-beam bathymetric chart according to a isobath layer, a depth layer, and a modification layer;

5.1) in the isobath layer, building intermediate contour, auxiliary contour, index contour and depth annotations of index contour according to mapping scale and national standard;

5.2) in the modification layer, adding map title, scale, legend, frame, latitude and longitude lines and coastlines;

5.3) in the depth layer, traversing the model DSSM, if the model point $dss_{I,J}$ is identified as 1, and the depth value dep_new$_{I,J}$ is not null, using the point as the feature point, if the depth value dep_new$_{I,J}$ is null, using dep$_{I,J}$ as the feature point;

5.4) if the soundings of the bathymetric chart are sparse, decreasing the value d of sub-blocking size, returning to step 3;

5.5) if the soundings of the bathymetric chart are dense, increasing the value d of sub-blocking size, returning to step 3;

5.6) overlaying the layers, if graphic elements superimpose on each other, or the graphic elements are dense, deleting some auxiliary graphic elements by a user according to the dense level.

Preferably, in the step 5.4), the sparse refers to that the distance D between any one point and its adjacent point is greater than double of d.

Preferably, in the step 5.5), the dense refers to that the distance D between any one point and its adjacent point is less than half of d.

Figure 4:
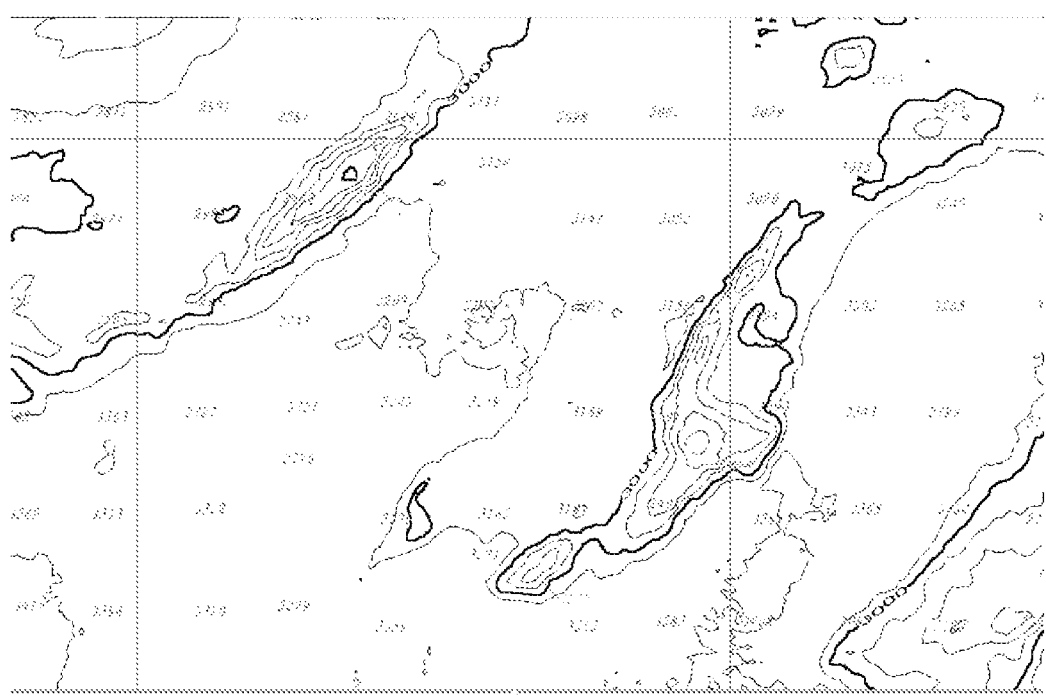
FIG. 4 illustrates a multi-beam bathymetric chart as some embodiments of the present invention.

FIG. 4 illustrates a multi-beam bathymetric chart in the embodiment of the present invention.

What is claimed is:

1. A computer implemented multi-beam bathymetric chart construction method executed on a processor based on submarine digital depth model feature extraction, comprising the following steps of:

Step 1, constructing, on a processor, a digital depth model (DDM) by processing raw multi-beam data using a multi-beam postprocessing system as following:

1.1) applying tide correction, draft correction and sound velocity correction to the raw multi-beam echo sounding data set Raw={raw$_i$}$_{i=1,n}$, eliminating effects of water level and sound velocity on multi-beam echo sounding (MBES), and forming a preliminary processing data set Proc1={proc1$_i$}$_{i=1,n}$, wherein n is a natural number;

1.2) building a topographic trend surface, using automatic filtering method to process Proc1={proc1$_i$}$_{i=1,n}$, eliminating effects of gross errors on MBES, and forming a postprocessing data set Proc2={proc2$_i$}$_{i=1,n}$;

1.3) using three-view projection to process Proc2={proc2$_i$}$_{i=1,n}$, further eliminating effects of ocean noise of a variety of sources on MBES, and forming a discrete full-beam bathymetric data set Proc3={x$_i$, y$_i$, z$_i$}$_{i=1,m}$, wherein m is a natural number;

1.4) using Inverse Distance Weighted (IDW) method, building a digital model of Proc3={x$_i$, y$_i$, z$_i$}$_{i=1,m}$, forming the digital depth model $$DDM = \{ddm_{k,l} = \{x_{k,l}, y_{k,l}, dep_{k,l}\}\}_{k=1,K, \atop l=1,L}$$

wherein ddm$_{k,l}$ represents the digital depth model at data point (k,l), K is the number of rows of the model, L is the number of columns of the model, both K and L are natural numbers, x$_{k,l}$, y$_{k,l}$ represent coordinates and dep$_{k,l}$ represents depth value of data points of the model, respectively;

Step 2, establishing, on a processor, a depth, slope and second derivative composite model (DSSM) based on the DDM, 2.1) using eight-neighbor approach to calculate slope value slp$_{(i,j)}$ of each grid point of the DDM:

$$slp_{(i,j)} = \frac{1}{8} \sum_{i=k}^{k+1} \sum_{j=l}^{l+1} a\tan\left(\frac{\Delta z}{\Delta d}\right)$$

Δz=|dep$_{(i,j)}$−dep$_{(k,l)}$|, wherein Δz is depth difference from grid point (i,j) to (k,l) in the DDM;

Δd=$\sqrt{(x_{(i,j)}-x_{(k,l)})^2+(y_{(i,j)}-y_{(k,l)})^2}$, wherein Δd is distance from the grid point (i,j) to (k,l) in the DDM;

2.2) using the eight-neighbor approach to calculate the second derivative sec$_{(i,j)}$ of each grid point of the DDM:

$$sec_{(i,j)} = \frac{1}{8} \sum_{i=k}^{k+1} \sum_{j=l}^{l+1} a\tan\left(\frac{\Delta \delta}{\Delta d}\right)$$

$$\Delta\delta = |slp_{(i,j)} - slp_{(k,l)}|,$$

wherein Δδ is slope difference from the grid point (i,j) to (k,l) in the DDM;

2.3) forming the composite model $$DSSM = \{dss_{i,j} = (ddm_{i,j}, slp_{i,j}, sec_{i,j})\}_{i=1,K, \atop j=1,L}$$

wherein dss$_{i,j}$ represents the depth, slope and second derivative value at grid point (i,j), ddm$_{i,j}$ represents the digital depth model at grid point (i,j);

Step 3, extracting feature points based on DDM sub-blocks, 3.1) model sub-blocking:

sub-blocking the model DSSM by interlaced dislocation of squares with side length of d, wherein d is determined in accordance with cartographic scale, d=[0.018×scale,0.03×scale], wherein scale is a scale value; or d is specified directly by a user;

wherein the interlaced dislocation refers to that if a i-th row of the model is sub-blocked by d as interval, when it comes to a (i+Δi)-th row, leaves a half of d as interval firstly, and then sub-blocks the model by d as interval; thus the interlaced dislocation results in a diamond structure of sub-blocking;

after the sub-blocking, obtaining a new diamond grid model $$DSSM1 = \left\{dss1_{I,J} = \{dss_{i,j}\}_{i=I,I+\Delta i, \atop j=J,J+\Delta i}\right\}_{I=1,K1, \atop J=1,L1}$$

wherein each sub-block dss1$_{I,J}$ consists of sub-models $$\{dss_{i,j}\}_{i=I,I+\Delta i, \atop j=J,J+\Delta i},$$

K1 and L1 are the number of rows and columns of the sub-blocking model, respectively, and both K1 and L1 are natural numbers;

3.2) Calculating the sub-blocking model:
3.2.1) Calculating an average depth value $$\overline{dep}_{I,J} = \frac{1}{Num}\sum_{i=I}^{I+\Delta i}\sum_{j=J}^{J+\Delta i} dep_{(i,j)} \text{ of } dss1_{I,J} = \{dss_{i,j}\}_{\substack{i=I,I+\Delta i \\ j=J,J+\Delta i}},$$

an average slope value $$\overline{slp}_{I,J} = \frac{1}{Num}\sum_{i=I}^{I+\Delta i}\sum_{j=J}^{J+\Delta i} slp_{(i,j)},$$

and an average second derivative value $$\overline{sec}_{I,J} = \frac{1}{Num}\sum_{i=I}^{I+\Delta i}\sum_{j=J}^{J+\Delta i} sec_{(i,j)},$$

wherein Num is the number of grid points of each sub-blocking model, and Num is a natural number;

3.2.2) Using the inverse distance weighted (IDW) method, calculating the depth value $\Delta dep_{I,J}$ of a central point of each sub-blocking model;

3.3) determining concavity and convexity of the sub-blocking model,
- 3.3.1) if $\Delta dep_{I,J} > \overline{dep}_{I,J}$, and $\overline{sec}_{I,J} > 0$, considering the surface of the sub-blocking model as concave;
- 3.3.2) if $\Delta dep_{I,J} < \overline{dep}_{I,J}$ and $\overline{sec}_{I,J} < 0$, considering the surface of the sub-blocking model as convex;
- 3.3.3) if in other cases, considering the concavity of the sub-blocking model not being determined hereby;

3.4) determining a feature depth point of the sub-blocking model,
- 3.4.1) if the surface of the sub-blocking model is concave, traversing the model $$dss1_{I,J} = \{dss_{i,j}\}_{\substack{i=I,I+\Delta i \\ j=J,J+\Delta i}},$$

selecting a maximum depth point $dss_{i\_max,j\_max}$ as the feature point; if there's more than one maximum depth point, selecting the point both with the maximum slope value and near the central point;

- 3.4.2) if the surface of the sub-blocking model is convex, traversing the model $$dss1_{I,J} = \{dss_{i,j}\}_{\substack{i=I,I+\Delta i \\ j=J,J+\Delta i}},$$

selecting a minimum depth point $dss_{i\_min,j\_min}$ as the feature point; if there's more than one minimum depth point, selecting the point both with the minimum slope value and near the central point;

- 3.4.3) if in other cases, selecting the central point $dss_{i\_cen,j\_cen}$ as the feature point;

3.5) identifying the feature points of the model,
If $dss_{i,j}$ is the feature point, setting identification as 1, otherwise setting the identification as 0;

Step 4, querying the multi-beam sounding data based on the feature points,
- 4.1) traversing the data set $Proc3=\{x_i, y_i, z_i\}_{i=1,m}$, querying the grid point $dss_{I,J}$ of the model according to the coordinates $(x_i, y_i)$ of each depth point, wherein the coordinates of the grid point $dss_{I,J}$ is $(X_I, Y_J)$;
- 4.2) if $dis=\sqrt{(x_i-X_I)^2+(y_j-Y_J)^2}<0.5\times grid\_d$, and $dss_{I,J}$ is identified as 1, using the IDW method, based on the data set $Proc3=\{x_i, y_i, z_i\}_{i=1,m}$, recalculating the depth value $dep\_new_{I,J}$ of the grid points of the model DSSM, wherein grid_d is spatial distance between nearest two points; and Step 5, constructing the multi-beam bathymetric chart based on layers,
using a mapping system or a geographic information system (GIS), constructing the multi-beam bathymetric chart according to a isobath layer, a depth layer, and a modification layer;
- 5.1) in the isobath layer, building intermediate contour, auxiliary contour, index contour and depth annotations of index contour according to mapping scale and national standard;
- 5.2) in the modification layer, adding map title, scale, legend, frame, latitude and longitude lines and coastlines;
- 5.3) in the depth layer, traversing the model DSSM, if the model point $dss_{I,J}$ is identified as 1, and the depth value $dep\_new_{I,J}$ is not null, using the point as the feature point, if the depth value $dep\_new_{I,J}$ is null, using $dep_{I,J}$ as the feature point;
- 5.4) if the soundings of the bathymetric chart are sparse, decreasing the value d of sub-blocking size, returning to step 3, wherein the term sparse refers to that the distance D between any one point and its adjacent point is greater than double of d;
- 5.5) if the soundings of the bathymetric chart are dense, increasing the value d of sub-blocking size, returning to step 3, wherein the term dense refers to that the distance D between any one point and its adjacent point is less than half of d;
- 5.6) overlaying the layers, if graphic elements superimpose on each other, or the graphic elements are dense, deleting some auxiliary graphic elements.

\* \* \* \* \*